United States Patent [19]

Schlepp et al.

[11] Patent Number: 4,568,868

[45] Date of Patent: Feb. 4, 1986

[54] REMOTE SOLAR POWERED LIGHT

[75] Inventors: Dennis R. Schlepp, Golden, Colo.; Kay Firor, Sunol, Calif.; Arlie Hooper, Monmouth, Ill.

[73] Assignee: Texas HiTech, Inc., Oklahoma City, Okla.

[21] Appl. No.: 640,523

[22] Filed: Aug. 14, 1984

[51] Int. Cl.⁴ ............................................... H02J 7/00
[52] U.S. Cl. .......................................... 320/5; 320/38; 320/40; 315/156; 315/360; 307/117
[58] Field of Search ....................... 320/2, 5, 37, 38, 39, 320/40; 315/156, 157, 360; 307/117, 126

[56] References Cited

U.S. PATENT DOCUMENTS

| | | |
|---|---|---|
| 2,889,490 | 6/1959 | Paradise . |
| 2,901,669 | 8/1959 | Coleman . |
| 3,231,747 | 1/1966 | Takeda . |
| 3,240,960 | 3/1966 | Woodward . |
| 3,317,809 | 5/1967 | Bowers . |
| 3,351,762 | 11/1967 | Adkins . |
| 3,428,861 | 2/1969 | Zinsmeyer . |
| 3,529,214 | 9/1970 | Corn . |
| 3,599,048 | 8/1971 | Olin ...................................... 317/124 |
| 3,673,413 | 6/1972 | Lee ....................................... 250/206 |
| 3,789,220 | 1/1974 | Schacht ............................... 250/206 |
| 3,916,183 | 10/1975 | Duve .................................. 250/206 |
| 3,995,202 | 11/1976 | Powers ................................ 317/124 |
| 4,008,415 | 2/1977 | De Avila-Serafin ............... 315/156 |
| 4,009,051 | 2/1977 | Kazis ....................................... 320/5 |
| 4,177,405 | 12/1979 | Chapdelaine ......................... 250/206 |
| 4,198,563 | 4/1980 | Elssner ............................ 250/214 AL |
| 4,209,728 | 6/1980 | Membreno ..................... 250/214 AL |
| 4,213,062 | 7/1980 | Jespersen ............................ 307/117 |
| 4,237,377 | 12/1980 | Sansum ......................... 250/214 AL |
| 4,314,198 | 2/1982 | Rogers ..................................... 320/5 |
| 4,362,970 | 12/1982 | Grady ................................... 307/117 |

Primary Examiner—Peter S. Wong
Assistant Examiner—Anita M. Ault
Attorney, Agent, or Firm—Robert C. Dorr

[57] ABSTRACT

An improved controller for an automatic seasonal adjusting solar powered light having a rechargeable battery, a solar array for charging the battery, and a lamp. A detector is connected to the solar array for activating a first timer, upon sunrise of a given day, to count down for approximately twenty-two hours and then, after countdown, for activating a second timer for turning the light on for approximately a two hour period just prior to the rising of the sun on the next given day. A third timer is activated upon the setting of the sun on the next given day to turn the lamp on for approximately four hours. The light is turned on only for a predetermined total amount of time during each given day even though the individual dawn and dusk times for the light being turned on can be selectively adjusted. A battery circuit is provided for deactivating the lamp activation circuit in the event of excessive drain on the battery or due to cloudy days.

8 Claims, 6 Drawing Figures

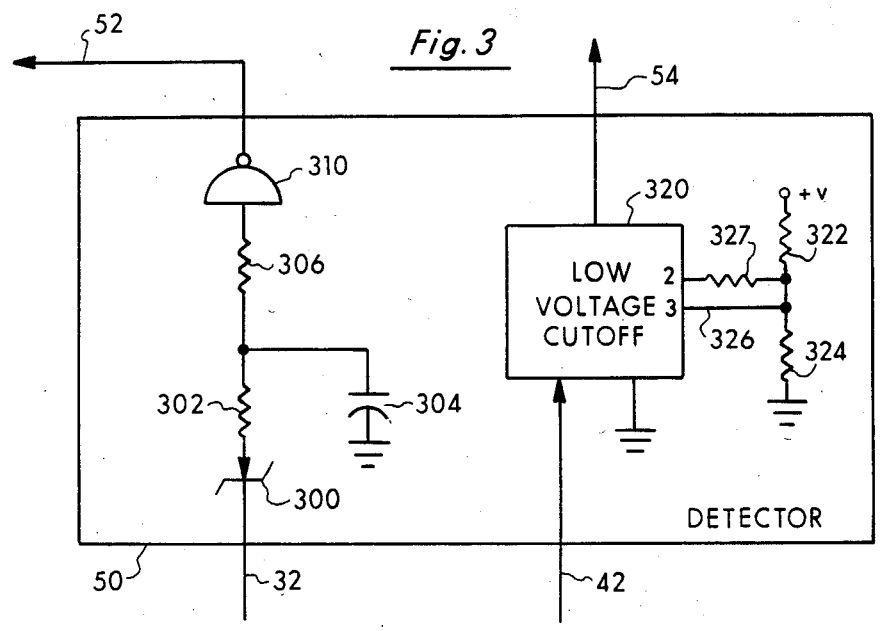
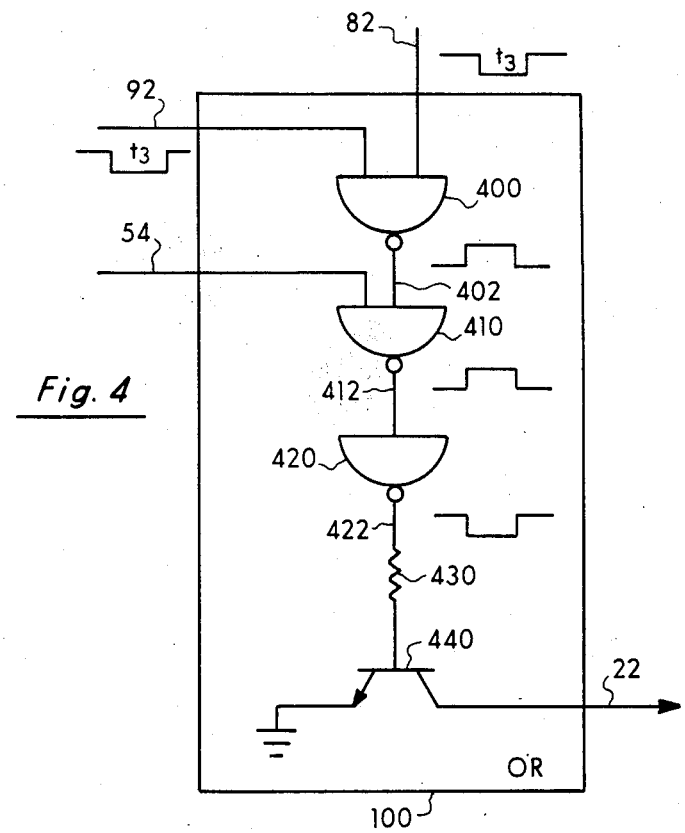

REMOTE SOLAR POWERED LIGHT

BACKGROUND OF THE INVENTION

1. Related Application

The assignee of the present invention is also the assignee of the following design patent application on the housing containing the present invention: "Solar Powered Light Housing", filed June 22, 1984, Ser. No. 623,378, Dennis R. Schlepp.

2. Field of the Invention

The present invention relates to remote solar powered devices and, more particularly, to solar powered lights and lamps that are automatically synchronized with the rising and the setting of the sun to track seasonal variations.

3. Discussion of Prior Art

A need exists in remote and rural locations for solar powered devices, such as lamps, that provide high illumination with excellent battery reliability.

Prior to the present application, a patentability investigation for such devices was performed in which the following prior art approaches were uncovered:

| Inventor | U.S. Pat. No. | Issue Date |
| --- | --- | --- |
| M. E. Paradise | 2,889,490 | June 2, 1959 |
| J. J. Coleman | 2,901,669 | Aug. 25, 1959 |
| H. G. Zinsmeyer | 3,428,861 | Feb. 18, 1969 |
| Katsumi Takeda | 3,231,747 | Jan. 25, 1966 |
| L. J. Woodward | 3,240,960 | March 15, 1966 |
| G. W. Bowers | 3,317,809 | May 2, 1967 |
| H. T. Adkins | 3,351,762 | Nov. 7, 1967 |
| P. R. Corn | 3,529,214 | Sept. 15, 1970 |
| Frank M. Olin | 3,599,048 | Aug. 10, 1971 |
| Art Lee | 3,673,413 | June 27, 1972 |
| Ezra Schacht | 3,789,220 | Jan. 29, 1974 |
| George Duve | 3,916,183 | Oct. 28, 1975 |
| John J. Powers | 3,995,202 | Nov. 30, 1976 |
| De Avila-Serafin | 4,008,415 | Feb. 15, 1977 |
| Earle W. Kazis | 4,009,051 | Feb. 22, 1977 |
| Chapdelaine | 4,177,405 | Dec. 4, 1979 |
| Egon H. Elssner | 4,198,563 | Apr. 15, 1980 |
| Robert Membreno | 4,209,728 | June 24, 1980 |
| Aksel Jespersen | 4,213,062 | July 15, 1980 |
| Victor Sansum | 4,237,377 | Dec. 2, 1980 |
| William Rogers | 4,314,198 | Feb. 2, 1982 |
| John K. Grady | 4,362,970 | Dec. 7, 1982 |

In the Sansum patent a sun-synchronized timer is set forth for use with a photoelectric lamp control circuit. The electric lamp is connected, at dusk, each evening and is disconnected a predetermined time later. The predetermined time starts with the dawn and produces a series of electrical timing pulses which enter a binary counter. The output of the binary counter is digitally compared with preset time values in an encoder and when the comparison is identical, a signal is generated to an output latch for deactivating the load and resetting the circuit. The user can encode whatever predetermined time he desires. Hence, the Sansum circuit is synchronized each day with the time of day.

The patent to Duve et al relates to a mechanical control unit which measures the span of time between dawn and dusk for each day. Based upon the "span of time" determination, a timer operates for a period of time after dusk. The period of time being longer when the span of time is shorter and shorter when the span of time is longer. Hence, the load which is turned on at dusk at deactivated at substantially the same time (for example midnight) each night, even though the length of time that the load is on varies with the seasons.

The Schacht patent relates to a light sensitive electrical timing circuit which causes a timer to become activated at dawn and to deactivate a load which was turned on at dusk a predetermined amount of time after dawn such as sixteen hours. Additionally, a compensation time circuit is provided for compensating seasonal changes so that the load is deactivated approximately the same time each night. The Schacht circuit utilizes bi-metal controls and mechanical timers to perform its operation.

The patent issued to Rogers uses a solar power source for its lighting system. The Rogers device is designed to be the power source for a low voltage solar light comprised of photovoltaic panels. At dusk, the system operates to turn the load on and an electronic timer is activated which generates a series of pulses into a binary counter which after a predetermined time deactivates the load.

The Woodward patent relates to a photoelectric lighting control which turns on a load at dusk and then turns it off a predetermined time later. With the rising of the next dawn, the timer is reset, but does not commence timing until dusk is again sensed.

Takeda et al teaches the use of a photoelectric self-correcting timing device for activating electric loads. The Takeda device being mechanical is designed to become activated each dawn and then to go through a mechanical process of revolution to compensate for the variations in the seasonal rising and setting of the sun.

The Grady patent relates to the provision of two timers interacting with each other and both being started at dusk to control street lamps or other loads including household hot water heaters. The first time frame is generated with the light change and at the end of the first time frame, the load is turned on or off. A second time frame which is longer than the first time frame is then used to turn the loads off.

The patent issued to Membreno relates to an outdoor lighting system and method wherein pulse shaping, counting, and reset circuits generate a first time frame commencing at dusk, the timing out of which, causes the load to become deactivated. The provision of a second time frame longer than the first, which when it times out, may cause the load to become activated, if it is still dark outside.

The Elssner patent relates to circuits similar to that of Membreno in that an electronic control circuit is provided which provides a timer activated at dusk to turn off an activated load after a predetermined time has elapsed. A "hold off" time interval is then provided as an override to prevent the photo detector from becoming activated for the hold off period of time.

In the patent issued to De Avila-Serafin et al a photo control for electric lamps is set forth wherein, at dusk, the load becomes activated and is turned off after a predetermined period of time. The predetermined period of time is determined by digitally counting pulses from an oscillator and determining the count to a predetermined value. When the predetermined count is reached, the circuit acts to turn the load off. The frequency of the pulses from the oscillator are changed according to the outside temperature to change the predetermined period of time based upon summer and winter conditions.

Zinsmeyer teaches the use of a photo electric timer control which causes a load to turn on a predetermined time before dawn and also a predetermined time after dusk. The circuit is electronic and can be modified so that the load is only turned on after dusk, only before dawn, or before dawn and after dusk. The predetermined time intervals can be adjusted by adjusting the potentiometer.

None of these prior art approaches sets forth the present invention, as wholly constituted, which provides a circuit which senses the prior dawn and counts down for a predetermined time interval to turn the light on for a predetermined period of time just before dawn of the next day. In addition, when dusk is sensed, a separate timer is provided which becomes activated to time out a predetermined time later. In addition, the present invention provides the detection of the ambient solar level by means of the solar array itself. The present invention further contemplates the use of a single control for adjusting three separate potentiometers so that certain parameters are met wherein the amount of time for turning the light on just before sunrise or after sunset can be varied but will always equal a predetermined fixed amount so as not to provide undue discharge of the battery. And finally, provision is made for monitoring the charge on the battery and for deactivating the lamp circuitry should the charge in the battery drop below a predetermined value.

SUMMARY OF THE INVENTION

The present invention relates to an improved controller for a solar powered device having a rechargeable battery, a solar array for selectively charging the battery, and a lamp being selectively powered by the battery. The improved circuitry of the present invention includes a detector, connected to the solar array, for detecting a predetermined level of ambient light on the solar array and for outputting a signal when the light rises above the predetermined level or falls below the predetermined level. In the event that light rises above the predetermined ambient level, a first timer, such as a twenty-two hour timer, is activated and counts down from the rising of the sun on a given day. At the completion of the first time interval, a second timer becomes activated for a second time interval, such as two hours, which turns the light on for an interval of time just prior to the rising of the sun on the next given day. When the ambient level falls below the predetermined level, a third timer is activated with the setting of the sun for turning the light on for preferably four hours.

All three timers of the present invention can be adjusted by the user of the invention to vary the amount of time the light is on. However, the circuitry of the present invention only permits the light to be on for a predetermined total, such as six hours each day. Finally, a battery protection circuit is provided which detects excessive drain on the battery, as for example a series of cloudy days preventing the solar array from recharging the battery, to deactivate the lamp activation circuit until the battery is recharged to a predetermined level.

DESCRIPTION OF THE DRAWING

FIG. 3 is a schematic of the detector of the present invention;

FIG. 4 is a schematic of the OR circuit of the present invention;

DETAILED DESCRIPTION

Figure 1:
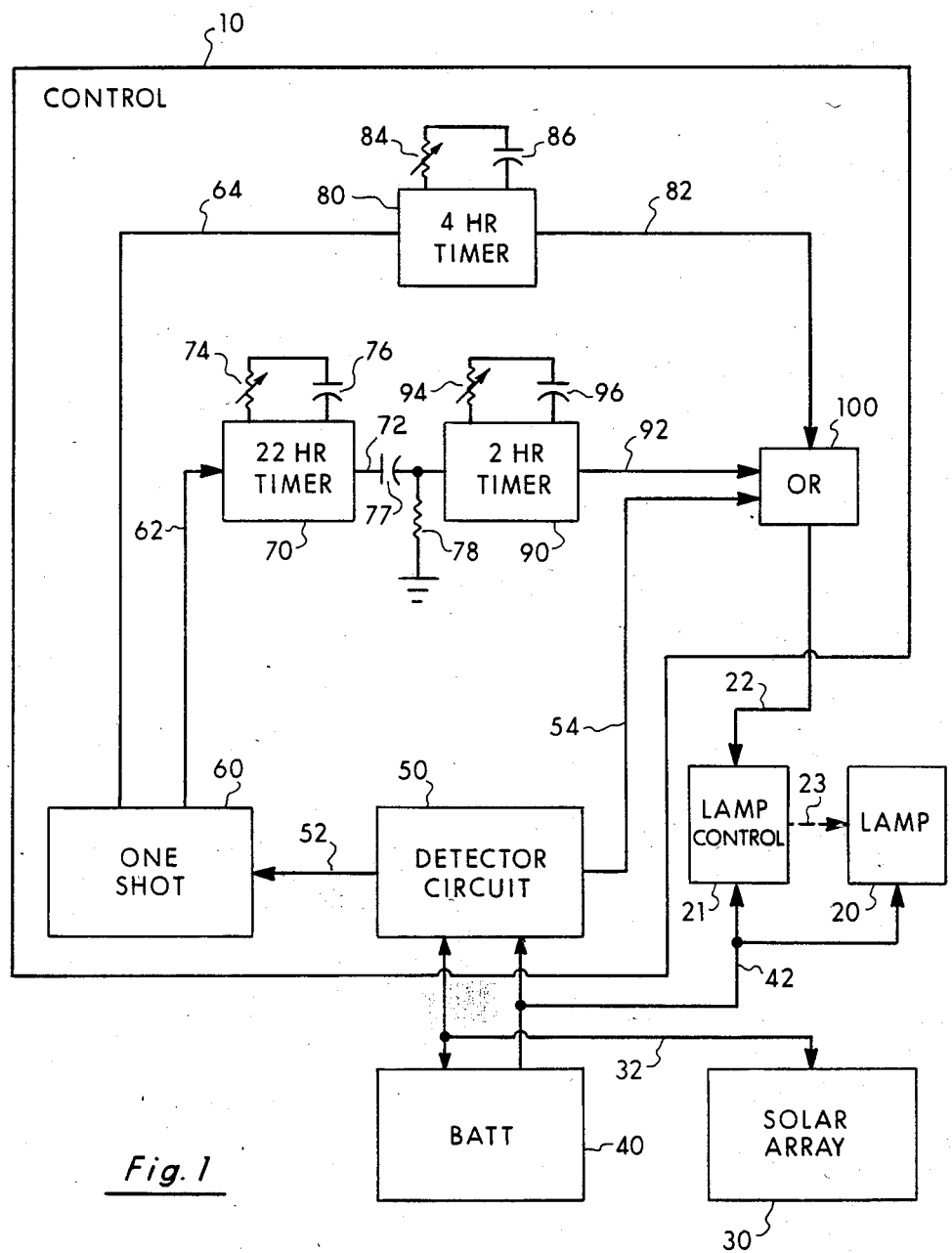
FIG. 1 is a block diagram of the circuitry of the present invention.

In FIG. 1, the general block diagram of the control circuit 10 of the present invention is set forth interconnected to a device such as a lamp control 21 (activating lamp 20) over line 22, to a solar array 30 over lines 32 and to a battery 40 over lines 42. The lamp 20 is conventional and of the type manufactured by LexaLite International Corporation, P.O. Box 498, U.S. 31 North, Charlevoix-The Beautiful, Mich. 49720 as the product trademarked ParLEX. The solar array is of the type manufactured by ARCO Solar, 21011 Warner Center Lane, Woodland Hills, Calif. 91365. The battery 40 is also conventional and of the type manufactured by Eagle Picher, P.O. Box 130, Seneca, Mo. 64865.

In normal operation, the lamp 20 is only on during certain predetermined time intervals which, under the teachings of the preferred invention, do not exceed a cumulative predetermined time such as, for example, six hours per day. Battery 40 functions to provide power to the lamp 20 over lines 42 and the battery 40 is charged by the solar array 30 over lines 32 so that the system of the present invention can provide a remote, stand-alone light.

The control 10 of the present invention includes a detector circuit 50 which is interconnected over line 52 to a one shot multivibrator circuit 60 and over line 54 to an OR circuit 100. The one shot multivibrator circuit 60 is further interconnected over lines 62 to a twenty-two hour timer 70 and over lines 64 to a four hour timer 80. The twenty-two hour timer 70 is interconnected over lines 72 to a two hour timer 90 which is connected over lines 92 to OR circuit 100. The four hour timer 80 is also interconnected over lines 82 to the OR circuit 100.

Figure 2:
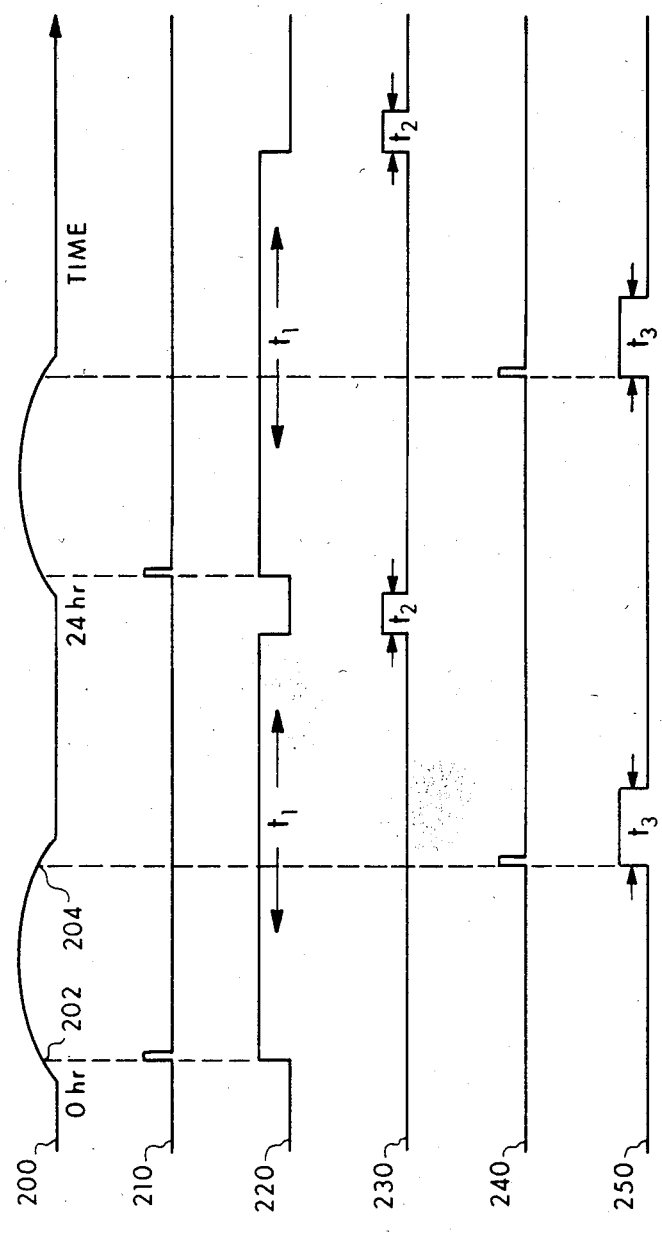
FIG. 2 sets forth, in illustration, the timing relationships of the present invention with respect to the solar ambient light level.

In general, and with reference to FIG. 2 which shows various signal relationships on a time scale of just over two full days, the control circuit 10 of the present invention functions as follows. Curve 200 illustrates the ambient light level generated by the sun during a clear day impacting on the solar array 30 which, of course, produces an ambient voltage level. Of course, at night no ambient level is generated. By using this ambient voltage level, the need for a separate photo-electric detector is eliminated. The detector circuit 50 at point 202 on the ambient light curve 200 generates a predetermined amount of voltage on line 32 which is sensed by detector circuit 50. The detector circuit 50 in turn activates the one shot circuit 60 over line 52 to cause the one shot circuit 60 to output pulse 210 on lines 62 to the twenty-two hour timer. The twenty-two hour timer on lines 72 outputs pulse 220 which is an output pulse capable of lasting a predetermined time, $t_1$, which in this case is twenty-two hours. At the end of the twenty-two hour period, the timer 70 times out causing the two hour timer 90 to become activated to output a pulse on curve 230 which pulse has a time duration of $t_2$ or in the preferred embodiment two hours. Pulse 230 is delivered over lines 92 to the OR circuit 100 and causes the lamp control 21 which is a relay to activate lamp 20 over connection 23 for the time period of $t_2$ or preferably two hours.

Likewise, when the ambient light level drops below the predetermined voltage level at point 204 on curve 200, the detector circuit 50 senses this drop, outputs a signal on lines 52 and causes the one shot 60 to output a pulse 240 on lines 64 to the four hour timer. The four hour timer 80 then outputs pulse 250 which is a four hour pulse on lines 82 to the OR circuit 100. This pulse 250 causes the lamp 20 to turn on for the time interval $t_3$ which, in this case, is four hours.

In operation, it can be observed that the lamp 20 is turned on the two hours just before the rising of the sun and is further turned on for four hours just after the setting of the sun. Because the time interval $t_2$ is determined twenty-two hours from the prior rising sun, the system automatically synchronizes itself to the changing daylight hours for different season.

One of the features of the present invention, which will be subsequently explained in greater detail, resides in the fact that the times $t_2$ and $t_3$ can be varied but must always equal six hours. Furthermore, the times $t_1$ plus $t_2$ must always equal twenty four hours even though either one can be varied independently. This is necessary in order to avoid excessive drain on the battery 40 of the present invention.

FIG. 3 is sets forth the details of the detector circuit 50 of the present invention to include two separate functions. The first function is to determine the presence of a predetermined voltage level corresponding to the level of ambient light hitting the solar array 30. This is determined over line 32 which inputs to a protective zener diode 300 the output of which is delivered into resistor 302 which is delivered through capacitor 304 to ground and which is further delivered through resistor 306 into the input of NAND gate 310. The output of NAND gate 310 is delivered over lines 52 to the one shot circuit 60. The purpose of the circuitry as set forth, is to detect a predetermined ambient voltage such as eight volts appearing on line 32 and to clip the voltage appearing on that line to no more than eight volts with the zener 100. That eight volt output charges the capacitor 304 as delivered into NAND gate 310 to provide proper buffering in order to protect the CMOS circuitry and suitable logic voltage to the remaining portions of the circuit.

The capacitor 304 in combination with the resistor 302 provides a time delay so that if someone would cover the solar array with an item or should headlights hit the solar array at night time, the fixed time delay will be sufficient to prevent spurious or inadvertent activation or deactivation of the circuit.

The second function of the detector circuit 50 is to provide a low voltage cutoff circuit 320 which is an integrated circuit chip conventionally available as Model No. 8211 from a number of manufacturers. This integrated circuit chip 320 is properly biased by resistors 322 and 324 and will operate in a fashion to be described subsequently. In addition, a resistor 327 is interconnected to provide proper hysteresis for turn on and turn off. In any event, the battery voltage is delivered over lines 42 and is compared to a predetermined and selected voltage level and if the battery level falls below the level on line 326, an output signal is generated on line 54 to deactivate the OR circuit 100.

The one shot circuit 60, as shown in FIG. 1, is a conventionally available integrated circuit chip Model No. 4536 available from a number of manufacturers. It is interconnected to various selected resistors and capacitors to provide two output pulses on lines 62 and 64.

The pulse on line 62 is triggered on the leading edge of the pulse 200 and a second pulse on line 64 is triggered by the trailing edge of pulse 200.

In the preferred embodiment, the twenty-two hour timer 70 is available as an integrated circuit chip Model 4536 available from Motorola. This chip is conventionally interconnected with potentiometer 74 and capacitor 76 to provide a pulse length of $t_1$ as shown by curve 220 in FIG. 2. Adjustment of potentiometer 74 permits individual adjustment of the timer 70 to increase or decrease the twenty-two hour period.

The two hour timer 90 and the four hour timer 80 are also the aforesaid Model No. 4536 and have different potentiometers 94 and 84 and capacitors 96 and 86 values to achieve the proper timing durations of $t_2$ and $t_3$ and variations thereof.

FIG. 4 sets forth the details of the OR circuit 100 to include a NAND gate 400 receptive of either signals on leads 82 or 92 for delivery of a resultant signal over leads 402 to a NAND gate 410 which also receives an input over line 54 from the detector circuit 50. The signals on leads 82 and 92 provide schmidt trigger levels so as to eliminate the effects of noise. The output of the NAND gate 410 is delivered over line 412 into a second NAND gate to act as an inverter 420 which delivers its output over line 422 through resistor 430 into the base of a transistor 440 which delivers a control signal over line 22.

In operation, the OR circuit 100 of FIG. 4 functions as follows. The appearance of either signals $t_2$ or $t_3$ is detected by gate 400 and that signal is transmitted or extended through to activate the transistor 440. It is to be noted that the actual signals appearing on lead lines 82 and 92 are inverted from that illustrated in FIG. 2 as curves 230 and 250, respectively. The detector circuit 50 can disable the operation of the OR circuit 100 by delivering a low signal on line 54 to disable gate 410. In that case, the signals corresponding to intervals $t_2$ and $t_3$ are inhibited and cannot function to turn on the light 20.

Figure 5:
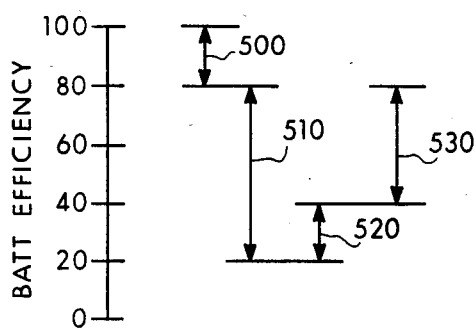
FIG. 5 is a chart illustrating the supervision of the battery charge.

The operation of the low voltage cutoff chip 320 in the detector circuit 50 of the present invention is set forth in FIG. 5. In normal operation, the battery 40 functions between 80 and 100 percent efficiency. This is shown by arrow 500. This is the normal cycling range. In this range, the battery of the present invention 40 is capable of operating for four consecutive days and in activating light 20 for a cumulative total of six hours each day. Hence, if the solar array 30 is incapable of charging the battery 40 because of cloudy weather, the battery 40 will function, under the teachings of the present invention, to continue to light the lamp 20 for four consecutive cloudy days (six hours of light each day). However, should the drain on the battery 40 continue to occur into the fifth cloudy day, the efficiency drops below the 80 percent level and this low voltage, for example, 10.85 volts, is detected by the low voltage cutoff circuit 320. A signal is then outputted on line 54 to the NAND gate 410 in FIG. 4 to deactivate the operation of the lamp 20. As long as the battery is between 20 and 80 percent efficiency, the lamp will be deactivated under the teachings of the present invention which is represented by arrow 510. However, when the solar array is able to commence charging the battery 40 once again, the system of the present invention permits exclusive charging (i.e., no lamp drain) to occur as indicated by arrow 520. This is a period of dedicated charging. However, after the battery has reached 40 percent efficiency, then the system is capable of both charging the battery and operating the lamp which is represented by arrow 530.

Figure 6:
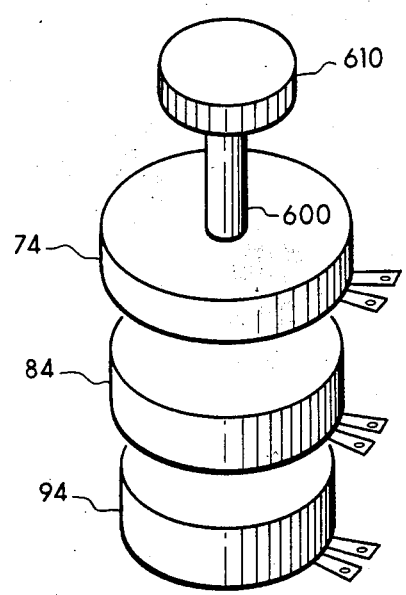
FIG. 6 is an illustration, in perspective view, showing the adjustment of the three potentiometers of the present invention with a single control.

In FIG. 6, is set forth one arrangement for controlling the potentiometers 74, 84, and 94. As previously mentioned, the four hour timer 80 and the two hour timer 90 must always be set to cumulatively equal six hours although each individual potentiometer 84 and 94, respectively, can be varied. In addition, timer 70 and timer 90 must always equal twenty four hours even though potentiometers 74 and 94 can be varied individually. Hence, if timer 80 is adjusted up to five hours, timer 90 is automatically adjusted down to one hour and timer 70 is adjusted down to twenty-one hours. By utilizing a single shaft 600 interconnected mechanically with potentiometer 74, 84, and 94 as shown in FIG. 6, the operator, by normally adjusting knob 610, can adjust the times $t_1$, $t_2$, and $t_3$ according to the above parameters. It is to be expressly understood that the potentiometers can be individually adjusted to stay within the aforesaid defined parameters.

While the present invention has been set forth in a preferred embodiment, it is to be expressly understood that changes and modifications may be made thereto which changes and modifications would still fall within the teachings of the following claims.

We claim:

1. An improved controller for a solar powered device having a rechargeable battery, a solar array for selectively charging the battery and a device being selectively powered by said battery, said improved controller comprising:
    means connected to said solar array for detecting a predetermined level of voltage, said predetermined level of voltage corresponding to a predetermined level of ambient light impacting on said solar array,
    means connected to said detecting means for generating first and second signals, said generating means control being capable of providing said first signal when said ambient light level increases above said predetermined value and being capable of producing said second signal when said ambient light level decreases below said ambient light level,
    first means receptive of said first control signal from said generating means for producing a first time interval of predetermined length, said first time interval commencing with the rising sun on a given day,
    means connected to said first means for outputting a second time interval of predetermined length commencing with the completion of said first time interval, said second time interval being timed to occur one or a plurality of hours before the rising sun of the next given day,
    second means receptive of said second control signal from said generating means for producing a third time interval of predetermined length, said third time interval commencing with the setting of the sun on said next given day,
    means receptive of said second and third time intervals for activating said device only during said second and third time intervals, said second and third time intervals when added together being equal to a fixed time value so that said device is only activated for only said fixed time during said given day, and
    means connected to said battery and to said activation means for deactivating said activating means when the voltage from said battery drops below a predetermined value thereby preventing the activating of said device during said second and third time intervals.

2. An improved controller for a solar powered device having a rechargeable battery, a solar array for selectively charging the battery and a device being selectively powered by said battery, said improved controller comprising:
    means connected to said solar array for detecting a predetermined level of voltage, said predetermined level of voltage corresponding to a predetermined level of ambient light impacting on said solar array,
    means connected to said detecting means for generating first and second signals, said generating means control being capable of providing said first signal when said ambient light level increases above said predetermined value and being capable of producing said second signal when said ambient light level decreases below said ambient light level,
    first means receptive of said first control signal from said generating means for producing a first time interval of predetermined length, said first time interval commencing with the rising sun on a given day,
    means connected to said first means for outputting a second time interval of predetermined length commencing with the completion of said first time interval, said second time interval being timed to occur one or a plurality of hours before the rising sun of the next given day,
    second means receptive of said second control signal from said generating means for producing a third time interval of predetermined length, said third time interval commencing with the setting of the sun on said next given day, and
    means receptive of said second and third time intervals for activating said device only during said second and third time intervals, said second and third time intervals when added together being equal to a fixed time value so that said device is only activated for only said fixed time during said given day.

3. The improved controller of claim 2 wherein said first timer further comprises means for varying the time in said first time interval.

4. The improved controller of claim 2 wherein said second timer further comprises means for varying the time in said second time interval.

5. The improved controller of claim 2 wherein said third timer further comprises means for varying the time in said third time interval.

6. An improved controller for a solar powered device having a rechargeable battery, a solar array for selectively charging the battery and a device being selectively powered by said battery, said improved controller comprising:
    means connected to said solar array for detecting a predetermined level of voltage, said predetermined level of voltage corresponding to a predetermined level of ambient light impacting on said solar array,
    means connected to said detecting means for generating first and second signals, said generating means control being capable of providing said first signal when said ambient light level increases above said predetermined value and being capable of producing said second signal when said ambient light level decreases below said ambient light level, means operative with said generating means for delaying the generation of said first and second signals if said predetermined voltage is less than a fixed time interval so that spurious levels of ambient light do not affect said generating means, first means receptive of said first control signal from said generating means for producing a first time interval of predetermined length, said first time interval commencing with the rising sun on a given day, means connected to said first means for outputting a second time interval of predetermined length commencing with the completion of said first time interval, said second time interval being timed to occur one or a plurality of hours before the rising sun of the next given day, second means receptive of said second control signal from said generating means for producing a third time interval of predetermined length, said third time interval commencing with the setting of the sun on said next given day, means receptive of said second and third time intervals for activating said device only during said second and third time intervals, said second and third time intervals when added together being equal to a fixed time value so that said device is only activated for only said fixed time during said given day, and means connected to said battery and to said activation means for deactivating said activating means when the voltage on said battery drops below a predetermined value thereby preventing the activating of said device during said second and third time intervals.

7. An improved controller for a solar powered device having a rechargeable battery, a solar array for selectively charging the battery and a device being selectively powered by said battery, said improved controller comprising:

means connected to said solar array for detecting a predetermined level of voltage, said predetermined level of voltage corresponding to a predetermined level of ambient light impacting on said solar array, means connected to said detecting means for generating first and second signals, said generating means control being capable of providing said first signal when said ambient light level increases above said predetermined value and being capable of producing said second signal when said ambient light level decreases below said ambient light level, a first selectively adjustable timer receptive of said first control signal from said generating means for producing a first time interval of predetermined variable length, said first time interval commencing with the rising sun on a given day, a second selectively adjustable timer connected to said first timer for outputting a second time interval of predetermined variable length commencing with the completion of said first time interval, said second time interval being timed to occur one or a plurality of hours before the rising sun of the next given day, a third selectively adjustable timer receptive of said second control signal from said generating means for producing a third time interval of predetermined variable length, said third time interval commencing with the setting of the sun on said next given day, means receptive of said second and third time intervals for activating said device only during said second and third time intervals, said second and third time intervals when added together being equal to a fixed time value so that said device is only activated for only said fixed time during said given day, and means connected to said battery and to said activation means for deactivating said activating means when the voltage on said battery drops below a predetermined value thereby preventing the activating of said device during said second and third time intervals.

8. The improved controller of claim 7 further comprising means connected to said first, second, and third selectively adjustable timers for varying said first, second, and third time intervals simultaneously.

* * * * *